Y2587 OR 3,598,964 SEARCH ROOM

[11] 3,598,964

[72] Inventors Robert Dell
Sudbury, England
John Benjamin Crews, Los Angeles, both of, Calif.
[21] Appl. No. 688,422
[22] Filed Dec. 6, 1967
[45] Patented Aug. 10, 1971
[73] Assignee Advance Data Systems Corporations
Beverly Hills, Calif.
Continuation-in-part of application Ser. No. 460,771, June 2, 1965, now abandoned.

[54] DATA PROCESSING SYSTEMS AND APPARATUS THEREFOR

7 Claims, 3 Drawing Figs.

[52] U.S. Cl. 235/61.6 R, 235/61.11 D, 235/61.11 E
[51] Int. Cl. G06k 7/08
[50] Field of Search 340/149, 146.3; 235/61.111, 61.115, 61.114, 61.12, 61.9, 61.11, 61.6; 283/18

[56] References Cited

UNITED STATES PATENTS

| | | | |
|---|---|---|---|
| 2,640,647 | 6/1953 | Rand, Jr. | 235/61.12 M |
| 2,952,008 | 9/1960 | Mitchell et al. | 235/61.114 |
| 3,356,021 | 12/1967 | May et al. | 235/61.9 |
| 3,483,511 | 12/1969 | Rabinow | 340/146.3 |
| 3,496,341 | 2/1970 | Yukio Mizuta et al. | 235/61.11 |
| 2,914,746 | 11/1959 | James | 340/149 |
| 3,211,470 | 10/1965 | Wilson | 283/18 |
| 3,277,283 | 10/1966 | Rabinow | 235/61.11 |

*Primary Examiner*—Thomas A. Robinson
*Assistant Examiner*—William W. Cochran
*Attorneys*—Alan C. Rose, Alfred B. Levine and Jerome B. Rockwood

ABSTRACT: Data processing apparatus and cooperating tickets adapted for use in a transportation system. The ticket has fare data encoded on one side, as well as direction-of-travel indicia. Reading heads will read the indicia on the ticket irrespective of ticket orientation. Gate circuits responsive to a direction-of-travel indicia-reading head and data-reading heads place the data read into a storage register with the digits in proper significant order, whether the highest or lowest significant digit is read first. The read data is then compared with preset data, and a barrier release signal is provided if the read data is satisfactory.

INVENTORS:
Robert Dell
John Benjamin Crews

By Jerome B Rockwood
AGENT

PATENTED AUG 10 1971 3,598,964

SHEET 2 OF 2

INVENTORS:
Robert Dell
John Benjamin Crews

By Jerome B. Rockwood

AGENT

DATA PROCESSING SYSTEMS AND APPARATUS THEREFOR

This is a continuation-in-part of application Ser. No. 460,771, filed June 2, 1965, now abandoned, for Data Processing Systems and Apparatus Therefor, by Robert Dell and John Benjamin Crews.

This invention relates to an electronic binary-coded data reading and processing system and apparatus therefor, and particularly to a system and apparatus for reading and interpreting binary-coded data recorded on a railway ticket or like record medium, and producing control signals in accordance with the significance of the data read from the ticket, to effect operation of a ticket barrier exit or entrance gate.

An object of the present invention is to provide electronic reading and processing apparatus capable of reading and interpreting data recorded on a ticket irrespective of the orientation of the ticket with respect to the reading apparatus.

A more general object of the invention is to provide apparatus capable of reading data from a ticket presented thereto, comparing the read data with preset data and utilizing signals representative of the result of the comparison to control the operation of a ticket barrier.

Thus, according to the invention, there is provided an electronic binary-coded data reading and processing system including reading means adapted to sense data recorded on a ticket presented thereto and to produce output signals indicative thereof, means for producing output signals indicative of preset reference data, coincidence means for effecting a comparison between the read and reference signals and control means responsive to the result of the comparison for effecting control of the operation of a ticket barrier gate.

Figures 1, 2A:
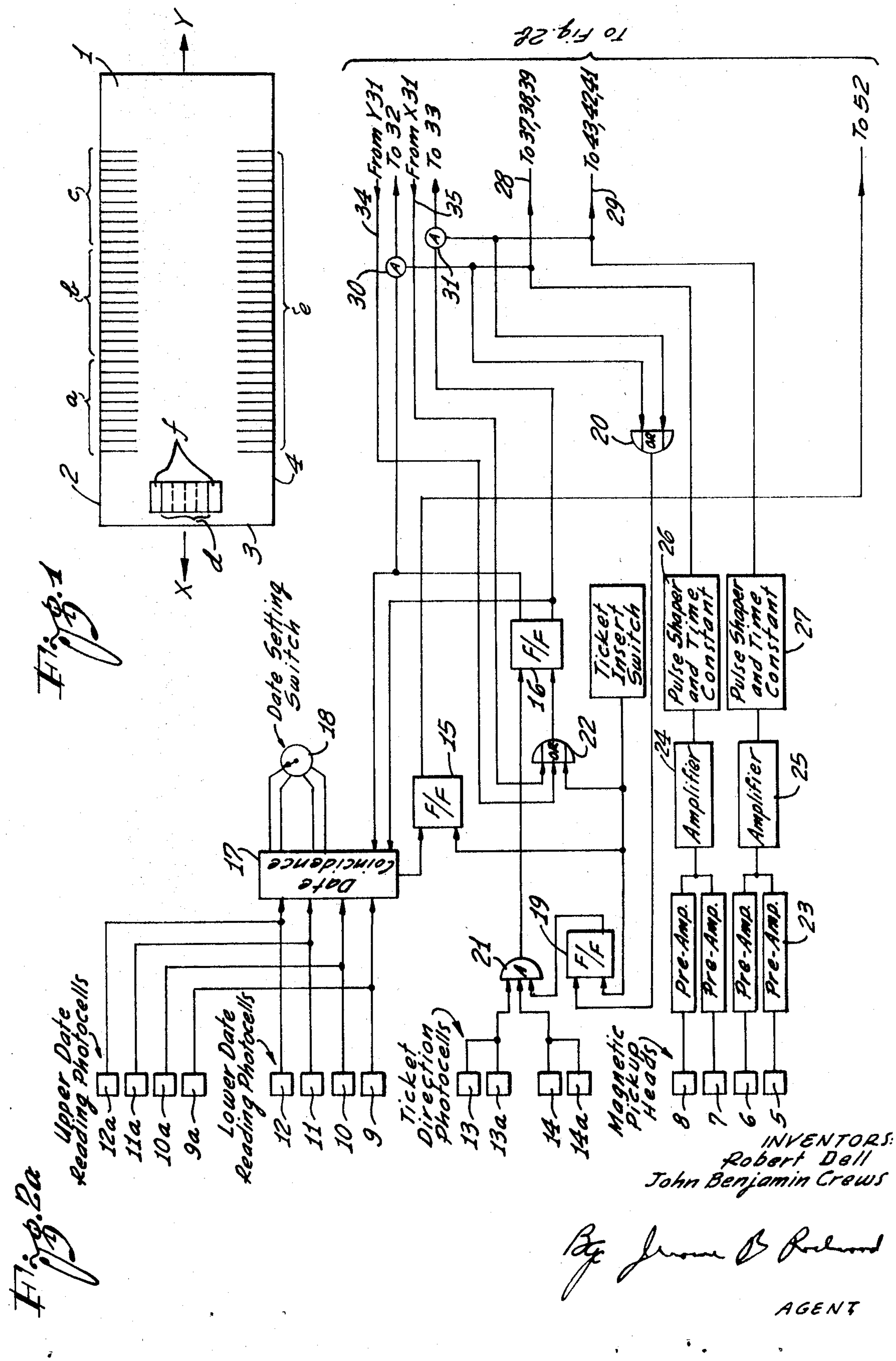
Figure 2B:
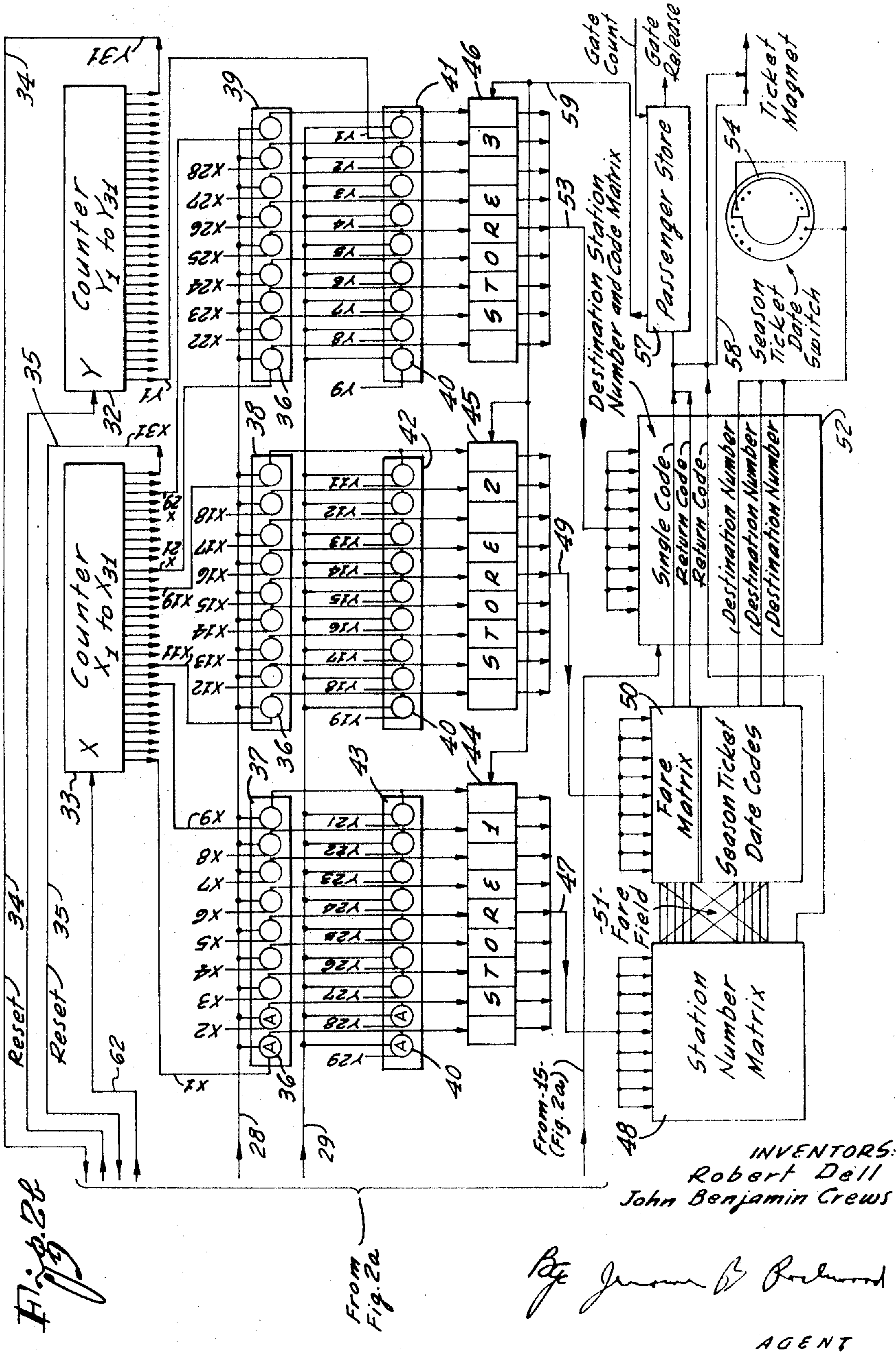

The invention will be described by way of example only with particular reference to the accompanying drawing wherein:

FIG. 1 is a schematic diagram of a ticket provided with coded data markings; and FIGS. 2*a* and 2*b* are block schematics of the electronic data reading and processing apparatus of the invention for the interpretation of the data recorded on the ticket shown in FIG. 1.

Referring to FIG. 1, the ticket 1 is preferably printed on one surface only, with binary-coded markings. Along the longitudinal reading heads. 2 of the ticket, the markings are preferably arranged in three groups *a*, *b*, *c*, each group containing nine marks and representing a nine-digit binary number representative of information relating to the origin, destination, value or any other particulars required to identify the ticket and determine whether the ticket is valid or a particular journey made or about the be made. This information may be printed on the ticket in convenient convenient form, e.g. ordinary colored ink may be used for the data markings, for sensing by suitable photoelectric or light-sensitive means, or the ink may contain magnetic material for detection by magnetic reading heads. Alternatively, luminescent or phosphorescent marking materials may be used, or the binary data may be represented by holes punched in the ticket.

In the embodiment of the invention illustrated in FIG. 2, magnetic pickup heads are used to sense the data magnetically recorded along the longitudinal edge 2 of the ticket, and photocells are used to sense printed marks indicative of data information *d* represented as a four-digit binary numeral at one end 3 of the ticket 1 as shown in FIG. 1. Alternatively, the data information may be recorded and sensed magnetically. Along the edge 4 of the ticket, opposite the data marks *a*, *b*, *c*, a further set of magnetically recorded marks *e* is provided, the number of marks corresponding in number to those provided along edge 2 and each mark *e* along edge 4 being located opposite a corresponding mark provided along edge 2. The additional marks *e* are used as timing or reference marks, which when sensed by the magnetic reading heads, produce timing signals for the timed sequential control of components shown in FIG. 2. In an alternative embodiment, the timing marks *e* may be offset with respect to the data marks *a*, *b*, *c*, to provide an indication of the orientation of the ticket.

Thus, the provision of timing marks *e*, results in the generator of timing signals which may be interpreted as clock pulses for the system, insuring proper operation despite variations of speed of the ticket reader.

In addition, two marks *f* are provided at the end of the ticket adjacent marks *d*. Marks *f* are provided to determine the direction of travel of the ticket, further disclosed hereinbelow.

The apparatus schematically depicted in FIG. 2 is arranged to read the data markings recorded on the ticket and interpret the data to ascertain whether the ticket is valid for a journey made or about to be made by a passenger, and to operate an entrance or exit gate at a ticket barrier control point. The actual gate forms no part of the present invention and the invention is designed for use with any type of gate which may be controlled and released electronically.

The ticket is intended to be inserted in a slot by a passenger and moved past the photocells and magnetic reading heads. It is a feature of the present invention, that the orientation of the ticket with respect to the reading heads is immaterial. Either end of the ticket may be presented first to the heads, with the printed side uppermost or reversed.

Four magnetic pickup heads 5, 6, 7, 8 shown in FIG. 2 are provided and the heads are arranged in pairs, such as heads 5 and 7, and heads 6 and 8. Each pair has the heads spaced apart by a distance equal to the width of the ticket, so that while one head, such as head 5, reads the data recorded along edge 2 of the ticket, the other head of the pair, head 7, reads the timing marks along edge 4, and the pair of heads 5 and 7 are spaced apart to allow the ticket to pass therebetween. Only one pair of heads is actually reading data at any instant, according to whether the ticket is presented printed side uppermost or reversed. Similarly, the endwise orientation of the ticket, i.e. whether the end 3 containing the date information *d* is presented first or not, determines which head of the operable pair of reading heads reads the data along edge 2 and which reads the timing marks along edge 4.

As previously indicated, photocells are used to detect the date information *d* recorded on the ticket and these photocells are shown in FIG. 2 as 9, 9*a*, 10, 10*a*, 11, 11*a*, 12, and 12*a*. As with the magnetic reading heads 5, 6, 7, 8, the photocells 9, 9*a*, 10, 10*a*, 11, 11*a*, 12 and 12*a* are arranged to accommodate tickets presented to the cells printed side uppermost or reversed. Additional photocells 13, 13*a*, 14 and 14*a* are provided to determine the orientation of the ticket, i.e. whether the end containing the date information has been presented to the reading heads, i.e. the ticket is moving in the direction indicated by arrow Y in FIG. 1, or whether the ticket is reversed and is proceeding in direction X. The photocells 13, 13*a*, 14 and 14*a* are associated with suitable lamps and operate in conjunction with photocells 9, 9*a*, 10, 10*a*, 11, 11*a*, 12 and 12*a* to detect the position of the date information *d* with respect to the photocells to provide an indication whether the end of the ticket containing the date information *d* has been inserted first or last in the ticket-receiving slot. This information concerning the orientation of the ticket in the form of the presence or absence of a signal from photocells 13, 13*a*, 14 and 14*a*, is available before the along edges 2 and 4 of the ticket are sensed by the magnetic reading heads, and this ticket orientation information is utilized to feed the magnetically recorded data into data storage locations in the correct order irrespective of the orientation of the ticket. To achieve this, the orientation information is stored in one or the other of flip-flops 15 or 16.

As shown in FIG. 2, the output signals produced from the photocells 9, 9*a*, 10, 10*a*, 11, 11*a*, 12 and 12*a* in response to the sensing of the date marks *d*, are supplied to a date coincidence unit 17, where the date information is compared with preset date information supplied in the form of output signals from the date-setting switch 18. The output signals from photocells 13, 13*a*, 14 and 14*a* are applied to AND gate 21 and to flip-flop 16, whereby orientation information is stored, as the date coincidence read from the ticket is stored in flip-flop 15. Flip-flop 15 provides a "Date O.K." signal to matrix 52.

The output signals from magnetic pickup heads 5, 6, 7, 8, produced in response to the detection of magnetic data marks recorded along edges 2 and 4 of the ticket are supplied to preamplifier units 23, coupled in pairs, and the outputs from units 23 passed via amplifiers 24, 25 and pulse shaping and delay circuits 26, 27, to lines 28, 29, and also to the inputs of AND gates 30, 31, adapted to receive output signals indicative of ticket orientation information from flip-flop 16. AND gates 30 and 31 also receive signals over lines 34 and 35 from two counters, further disclosed hereinbelow, to provide output signals to OR gate 22, whose output constitutes one of the two inputs to flip-flop 16.

The timing marks recorded along edge 4 of ticket 1 are used to produce timing signals which are applied to AND gates 30, 31, to switch on either of counters 32 or 33 according to the state of flip-flop 16. The X and Y counters each have a 31-count capacity, the 31st count being used for reset purposes, by applying a reset pulse on lines 34, 35 to OR gate 22 to restore flip-flop 16 to its original state after a ticket has been sensed.

Twenty-seven of the outputs of the X and Y counter are connected to AND gate assemblies as shown via matrices. Counts 1 to 9, 11 to 19 and 21 to 29 of X counter 33 are connected to an input of corresponding AND gates 36 of gating units 37, 38, 39. Similarly, counts 1 to 9, 11 to 19 and 21 to 29 of Y counter 32 are connected to an input of corresponding AND gates 40 of gating units 41, 42, 43.

Output signals indicative of magnetic data recorded along edge 2 of the ticket is present on line 28 or line 29 according to the orientation of the ticket and applied to an input of gates 36 or 40 respectively. The single output of each gate 36 or 40 of gating units 37, 43; 38, 42; 39, 41; is connnected to the inputs of storage units 44, 45, 46, respectively, as shown.

In operation, if the ticket is presented to the ticket-receiving slot while travelling in effect in the X direction (FIG. 1) i.e. with the date information *d* and direction information *f* trailing the leading edge of the ticket, flip-flop 16 will reserve its first input signal over line 64, as the output for AND gate 21. A third input signal to gate 21, necessary to set flip-flop 16, is supplied from a ticket-insertion-sensing switch 66 over a flip-flop 19, the switch being closed upon presentation of a ticket. However, in the absence of signals from photocells 13, 14, 13*a*, 14*a*, the signal from switch 66 through a gate 22 will be the only input to flip-flop 16, resulting in an output signal on line 60. Thus, flip-flop 16 produces a signal at the input of gate 31. When the timing marks recorded along edge 4 are sensed by the magnetic heads, output signals indicative thereof are applied to the second input of AND gate 31 to switch on X counter 33, which operates to produce output signals sequentially on output lines $X_1$ to $X_{31}$, thereby supplying input signals sequentially to AND gates 36 of units 37, 38, 39. Thus, whenever data signals indicative of data recorded along edge 2 of a ticket, are present on line 28, in coincidence with an output signal from X counter 33, the AND gate 36 corresponding to the sequential count of the X counter will be opened to allow a signal to pass to the corresponding location of storage units 44, 45, 46.

Timing and data signals appearing on line 28 or line 29 open OR gate 20. The output of OR gate 20 serves to reset flip-flop 19, removing one of the input signals to AND gate 21. AND gate 21 is opened, cutting off any signals detected by ticket direction photocells 13, 13*a*, 14 and 14*a*. Therefore, after reading of the timing and data marks being, the ticket direction photocells are disabled.

In response to the detection of the timing marks recorded on the ticket, the X counter 33 will switch on the AND gates 36, to store the first nine digits of binary data read from edge 2 of the ticket, in storage unit 44. As the ticket progresses through the apparatus, the second set of nine-digit binary data is read by the magnetic reading heads and data signals indicative thereof are supplied to storage unit 45 in response to the stepping of X counter 33 through counts $X_{11}$ to $X_{19}$. Similarly, the third set of nine-digit binary data recorded on the ticket is stored in storage unit 46 during counts $X_{21}$ to $X_{29}$ of the X counter.

Should the ticket be presented to the ticket-receiving slot in the Y direction (FIG. 1), flip-flop 16, receiving a signal from ticket switch 66 over OR gate 22, but no signal from the photocells, supplies an input signal to AND gate 30, which is opened on the receipt of timing signals applied to the second input thereof, to switch on Y counter 32.

With the ticket travelling in the Y direction, the data marks recorded along edge 2 will be read backwards and hence must be placed in the reverse order in storage units 44, 45, 46. Thus, the first significant binary bit of information sensed will be the last digit of block *c* (FIG. 1), and this information is required to be inserted in the last storage location of storage unit 46. Accordingly, the outputs of the Y counter 32 are connected as indicated to the inputs of gates 40 to ensure that the data read from the ticket is stored in the correct order in the storage units, irrespective of the orientation of the ticket.

The date for which the single trip or return trip ticket is valid is encoded at *d* on ticket 1. As stated above, insertion of the ticket actuates ticket insert switch 66, thereby resetting flip-flop 15. As the date information passes the upper or lower date-reading photocells 9—12 or 9*a*—12*a*, the data are read into date coincidence unit 17. The date information signals are compared in the date coincidence unit 17 with signals representing the valid date set on date-setting switch 18. Since the order of the code from side to side would be dependent upon the orientation of the ticket, data are supplied by the output of flip-flop 16 to date coincidence unit 17. Upon coincidence of the date read from the ticket and the date set on date-setting switch 18, date coincidence unit 17 provides an output signal to flip-flop 15, setting flip-flop 15. The output of flip-flop 15 is then applied to destination station number and code matrix 52.

In a preferred arrangement, the binary coded marks *a* (FIG. 1) are representative of data relating to the station number of origin of the ticket, and this information is required to be stored temporarily in storage unit 44. The outputs of this storage unit 44, are connected via line 47 to a diode matrix 48 arranged to decode the binary data and converts the same to signals indicative of the station numbers. The second group of data *b* (FIG. 1) represents information relating to the fare value of a ticket and thus, the second storage unit 45, is used to temporarily store this information, and might also include other code information indicating whether or not the ticket is a platform ticket, for example. The outputs of storage unit 45 are connected via line 49 to a further diode matrix 50, similar to that of matrix 48, but with the diodes interconnected such as to provide output signals on the coordinates indicative of the particular fares determined for the tickets. By suitable cross connections indicated by the fare field 51 between matrices 48 and 50, the fare applicable to any station number can be preset. The third binary group *c* recorded on each ticket may contain marks representative of information relating to the number of the destination station, for example, or the type of ticket, i.e. single, return, season. This information is required to be temporarily stored in storage unit 46 and provision may be made for using additional numbers as required, to identify special types of tickets. A further diode matrix 52 receives output signals from storage unit 46 via line 53, a "Date O.K." signal from flip-flop 15 and receives further signals from matrix 50 to produce output signals therefrom.

For providing signals indicative to season ticket information, since the season tickets may be for a week, month or quarter, a setting switch 45 is provided to supply signals indicative of preset season ticket data to matrix 52 and to a passenger store 57 and the switch may, of course, provide for season tickets having extended periods of validity, e.g. 6 months, 1 year, etc.

Output signals are produced on line 58 from matrix 52 indicating whether a ticket should be deposited in a ticket-collecting box, or returned to the commuter, and a ticket magnet or similar device would be provided for this purpose.

The information from storage units 44, 45, 46, decoded by the respective matrices 48, 50, 52, is combined to form a single output signal which is applied to the passenger store 57. The purpose of this store is to indicate the number of valid tickets which have been inserted in the ticket-receiving slot, and an output signal from store 57 is applied to a gate release circuit to allow passengers to pass therethrough.

As each passenger passes through the gate, mechanism may be provided to provide a pulse per passenger, which is fed back over line 68 to the passenger store 57 to release one storage unit for each passenger passing through, such that a passenger may, for example, insert a plurality of tickets into the reading mechanism, information that the tickets are valid stored in the passenger store until all tickets have been checked and the gate released for the correct number of passengers to pass through the barrier before the gate is again locked. The application to the passenger store 57 of a gate release pulse is arranged to feed a reset pulse via line 59 to the storage units 44, 45, 46, to restore these units to zero, ready for the receipt of data relating to the next ticket fed to the sensing apparatus. Similarly, as previously indicated, flip-flop 16 is reset by the last pulse count of counters 32 or 33 through OR gate 22 to prepare for the receipt of orientation information relating to the next ticket fed to the reading heads.

It will be appreciated that the invention has been described by way of example only and is in no way limited to the particular arrangement illustrated in the accompanying drawings.

We claim:

1. An electronic binary-coded data reading and processing system for tickets having markings recorded thereon representing date information, travelling data and timing data, comprising a first set of sensing heads responsive to the date information markings recorded on the ticket to produce signals indicative thereof, a further set of sensing heads responsive to the data and timing markings to produce distinctive output signals indicative of each, direction-indicating means responsive to the markings recorded on the ticket to provide signals indicative of the orientation or direction of travel of the ticket with respect to the sensing heads, gating means responsive to said timing signals and to said orientation signals and arranged to pass the timing signals to one or other of a pair of counting devices according to the orientation of the ticket, to initiate a count therein, further gating means responsive to output signals from said one or other counting devices indicative of the count therein and to said data signals, to pass a data signal upon coincidence between an output signal from the counting device and a data signal, means for storing said data signals passed by said further gating means, matrix means for comparing the data signals stored in said storage means with preset travelling data and arranged to produce a distinctive output signal whenever identity between sensed and preset data is established and control means responsive to said distinctive output signal to effect operation of a ticket barrier gate.

2. An electronic binary-coded data reading and processing system for tickets as claimed in claim 1 wherein each of said pair of counting devices comprises a binary counter having a content equivalent to the number of timing markings recorded on the ticket and having the output of each stage coupled to a matrix having a number of outputs equivalent to the counter content, each matrix output being connected to one input of a respective one of a plurality of gating devices each having a further input connected in common to means supplying said data signals whereby whenever an output signal from a counter coincides with a data signal, the latter is passed by the respective gate to said storage means and the interconnections between one counter and the respective gating devices being reversed compared with the interconnections between the other counter and the respective gating devices such that when a count is initiated in one or other of the counters, data is stored in said storage means in the correct order irrespective of the orientation or direction of travel of the ticket with respect to said reading heads.

3. An electronic binary-coded data reading and processing system as set forth in claim 2 wherein date information markings recorded on a ticket are sensed by photoelectric sensing means and timing and travelling data recorded on the ticket are sensed by magnetic sensing means.

4. An electronic binary-coded data reading and processing system as set forth in claim 2 wherein all data markings recorded on the ticket are sensed by magnetic sensing means.

5. An electronic binary-coded data reading and processing system as set forth in claim 2 wherein said direction-indicating means are reset by the last count content of either counting device.

6. An electronic binary-coded data reading and processing system as set forth in claim 2 wherein said storage means comprises a plurality of individual storage units each having associated therewith a respective decoding matrix arranged to provide a single output signal whenever identity is established between sensed and preset data signals supplied to said matrices, a further storage device being responsive to output signals from said matrices to produce a gate release signal from said further storage device whenever a predetermined number of tickets have been sensed.

7. An electronic binary-coded data recording and processing system as claimed in claim 6 wherein generation of a gate release pulse is arranged to reset all storage units to zero.